United States Patent [19]
Clopton

[11] Patent Number: 5,788,056
[45] Date of Patent: Aug. 4, 1998

[54] CONVEYOR FRAME WITH REMOVABLE TRACKS RETAINED BY SPRING PINS

[75] Inventor: Robert T. Clopton, Magnolia, Ky.

[73] Assignee: Tekno, Inc., Cave City, Ky.

[21] Appl. No.: 698,037

[22] Filed: Aug. 12, 1996

[51] Int. Cl.⁶ .................................................. B65G 13/00
[52] U.S. Cl. .................... 198/779; 198/841; 198/861.1; 238/10 R
[58] Field of Search .................... 198/804, 837, 198/838, 860.1, 860.2, 860.3, 845, 841, 779, 836.1, 861.1; 238/6, 7, 10 R

[56] References Cited

U.S. PATENT DOCUMENTS

| | | |
|---|---|---|
| 1,639,234 | 8/1927 | Sargeant ........................ 238/10 R |
| 3,964,800 | 6/1976 | Grimes et al. . |
| 4,501,353 | 2/1985 | Burkhardt . |
| 4,511,031 | 4/1985 | Lachonius . |
| 4,742,905 | 5/1988 | Beers . |
| 4,930,623 | 6/1990 | Johnson et al. . |
| 4,951,809 | 8/1990 | Boothe et al. . |
| 4,961,492 | 10/1990 | Wiseman et al. . |
| 4,993,541 | 2/1991 | Roh . |
| 5,029,697 | 7/1991 | McMillan et al. . |
| 5,082,108 | 1/1992 | Douglas .......................... 198/860.3 |
| 5,137,145 | 8/1992 | Clopton . |
| 5,186,314 | 2/1993 | Clopton . |
| 5,328,020 | 7/1994 | Clopton . |

FOREIGN PATENT DOCUMENTS

| | | |
|---|---|---|
| 113323 | 1/1989 | Japan . |
| 8901915 | 7/1989 | Netherlands . |

Primary Examiner—Joseph E. Valenza
Assistant Examiner—Mark Deuble
Attorney, Agent, or Firm—Wheat, Camoriano, Smith & Beres, PLC

[57] ABSTRACT

A conveyor frame supports a chain which rides on small rollers, with a large roller projecting upwardly from the frame. The frame includes rails on which the small rollers roll. The rails are retained in the frame by spring pins, which fit into slots in the frame. The rails can be inserted into the frame from the top and can readily be installed and replaced.

7 Claims, 4 Drawing Sheets

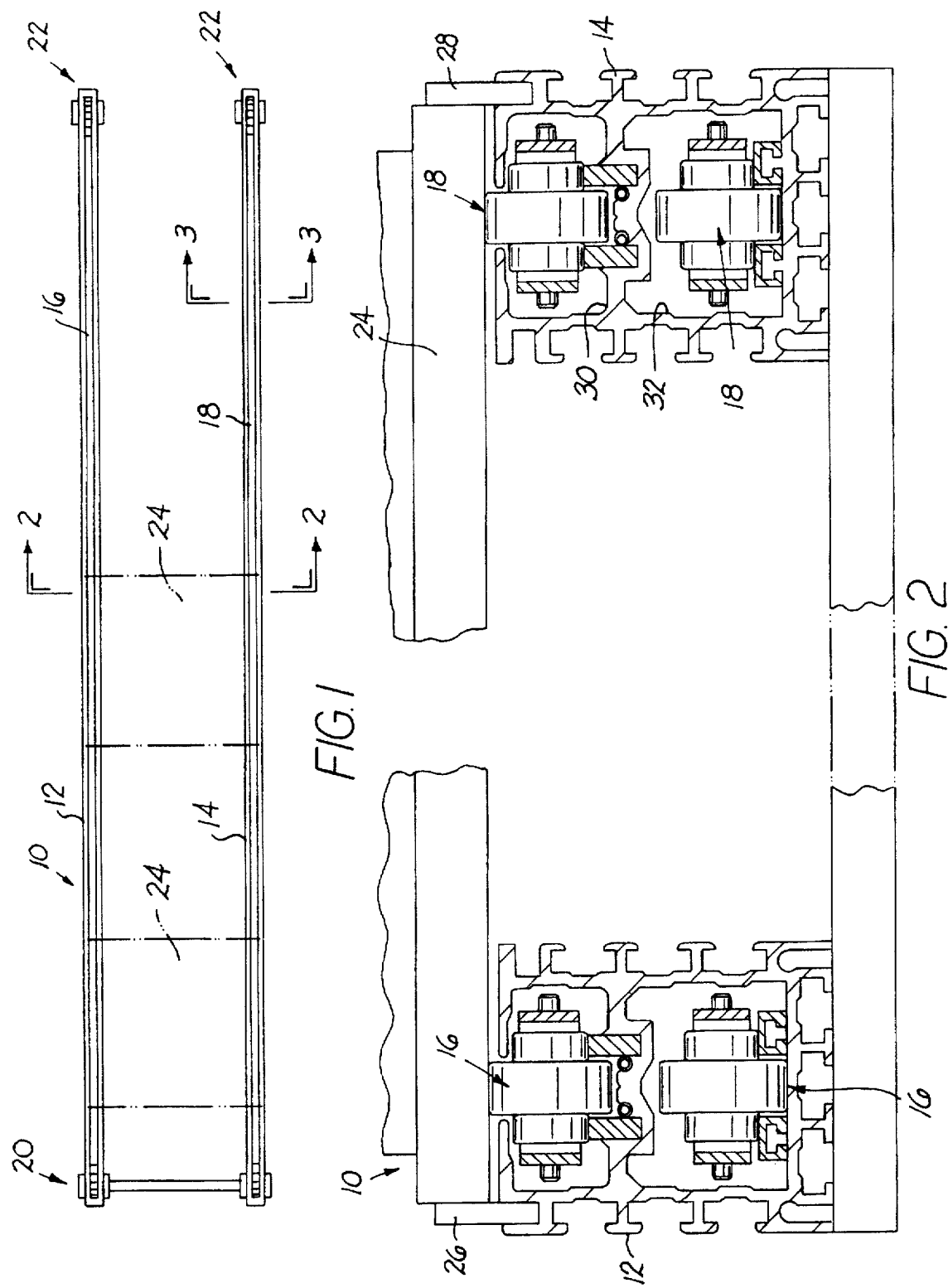

CONVEYOR FRAME WITH REMOVABLE TRACKS RETAINED BY SPRING PINS

BACKGROUND OF THE INVENTION

The present invention relates to conveyors, and, in particular, to the frames of conveyors which support conveyor chains that carry products along the length of the conveyor frame.

My U.S. Pat. No. 5,328,020 describes a conveyor frame which supports a conveyor chain having left and right small rollers and large central rollers. This type of conveyor chain permits products to be conveyed at a faster rate than the chain moves, because the small diameter rollers roll on rails in the conveyor frame and drive the central roller, which, in turn, carries the product, SO the product is carried a the chain speed plus the speed at which the large roller is rotating. This patent describes a way of retaining support rails on the conveyor frame to support the small rollers by extruding holes in the sides of the conveyor frame and then drilling and tapping through the holes so that set screws can be inserted from the outside to retain the rails. This retention mechanism works, but it requires a substantial amount of labor to drill and tap the holes. However, until the present invention, that was the best way I had found to retain the rails on the frame.

SUMMARY OF THE INVENTION

The present invention provides an improved conveyor frame, which does not require any drilling or tapping of holes in order to retain the rails on the frame.

The present invention provides an improved conveyor frame in which retaining slots are formed in the frame when it is made. These retaining slots open into their respective rail-receiving slots, so that retaining springs can be inserted into the retaining slots at intervals along the frame to retain the rails on the frame.

BRIEF DESCRIPTION OF THE DRAWINGS

FIG. 1 is a top view of a conveyor made in accordance with the present invention;

FIG. 2 is a view taken along the section 2—2 of FIG. 1;

DESCRIPTION OF THE PREFERRED EMBODIMENTS

Figure 3:
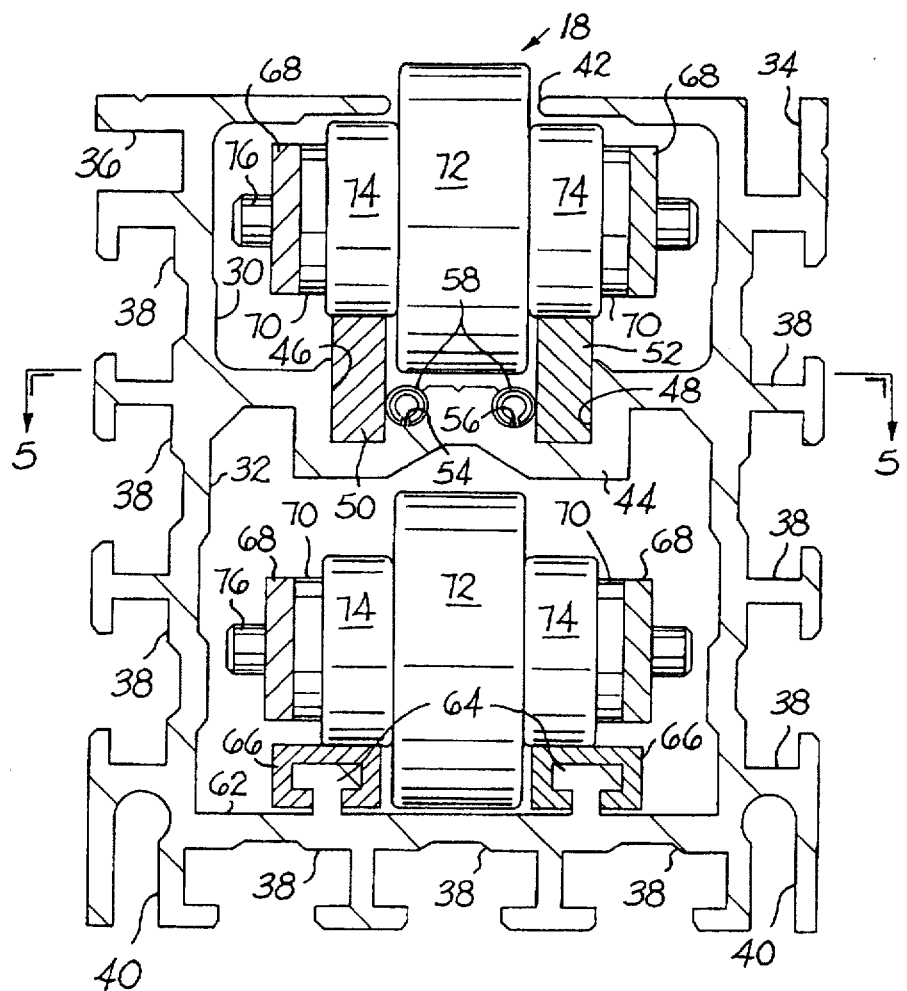
FIG. 3 is a view taken along the section 3—3 of FIG. 1.

FIG. 1 is a top view of a conveyor 10 made in accordance with the present invention. The conveyor 10 includes a left frame 12, and a right frame 14, which support a left chain 16, and a right chain 18, respectively. There is a drive 20 at one end of the conveyor, which drives the chains 16, 18, and there are idler sprockets 22 at the other end to support the chains 16, 18. Pallets 24 are shown in phantom. These pallets 24 are carried by the two chains 16, 18.

FIG. 2 shows an enlarged, sectional view of the conveyor 10, showing the left and right frames 12, 14 and the left and right chains 16, 18. A pallet 24 is shown being supported by the two chains 16, 18. FIG. 2 also shows left and right guide rails 26, 28, which are carried on the outside of the left and right frames 12, 14, respectively, and which contact the sides of the pallet 24 to keep the pallet 24 properly aligned with the conveyor 10. This figure also shows that each frame 12, 14 includes an upper chamber 30 and a lower chamber 32. The upper chambers 30 carry the portion of the chain 16, 18 that is carrying the pallets 24 in the forward direction, and the lower chambers 32 carry the chain 16, 18 on its return trip.

FIG. 3 shows the right frame 14 in more detail. There are several features on the exterior side of the frame 14, including an upwardly-directed guide slot 34, which carries the guide rail 26 (shown in FIG. 2), a left-directed slot 36, which can carry another guide rail (not shown), a plurality of T-slots 38, which make it easy to connect to the frame 14, and downwardly-directed grooves 40, for receiving pneumatic tubes and wires (not shown).

The upper chamber 30 defines a top opening 42 and includes a web 44, which defines the bottom of the upper chamber 30 and the top of the lower chamber 32. The web 44 defines left and right parallel, upwardly-opening, rail-receiving slots 46, 48, which receive elongated rails 50, 52. The rails 50, 52 are made as separate members from the frame 14 for two reasons. First, since the rails 50, 52 support the chain 18 and the load carried by the chain 18, they see much more wear than other parts of the frame 14. Therefore, they are preferably made of a different, more wear-resistant material from the rest of the frame. Second, since the rails 50, 52 see the wear, they do wear out and must be replaced. By making the rails 50, 52 as separate members from the frame 14, the rails can be replaced without requiring replacement of the entire frame 14. With the present design, the rails 50, 52 can be inserted and removed through the top opening 42 of the frame 14, making this operation very easy.

Adjacent to the left and right rail slots 46, 48 are left and right retaining slots 54, 56. The retaining slots 54, 56 are also formed in the web 44 and open into their respective rail slots 46, 48, so that a spring pin 58 inserted into the retaining slot 54 or 56 exerts a force, pushing the respective rail 50, 52 away from the pin 58 and against the opposite wall of the respective slot 46, 48, which retains the rails 50, 52 in their respective slots 46, 48.

Figure 3A:
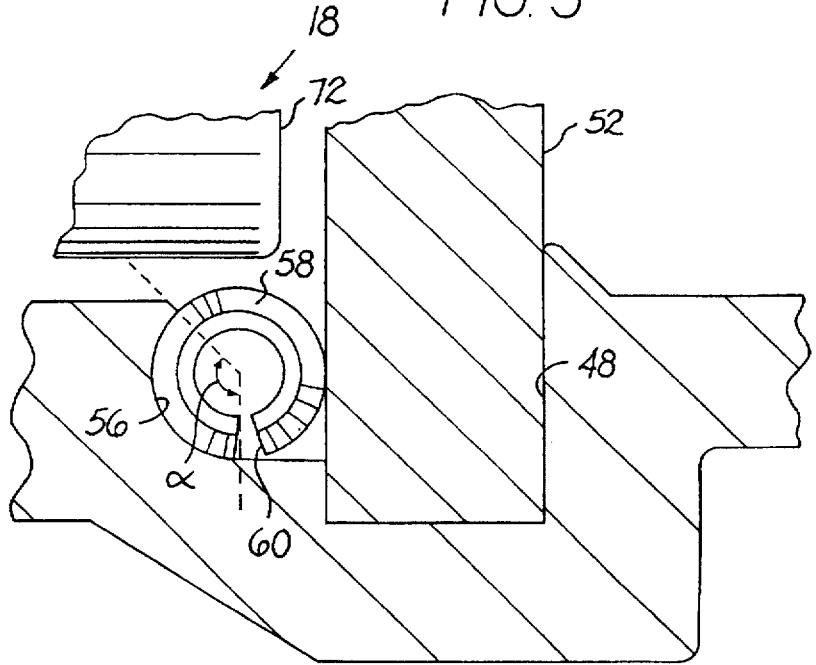
FIG. 3A is an enlarged view of a portion of FIG. 3, showing the rail and the spring pin.
Figure 6:
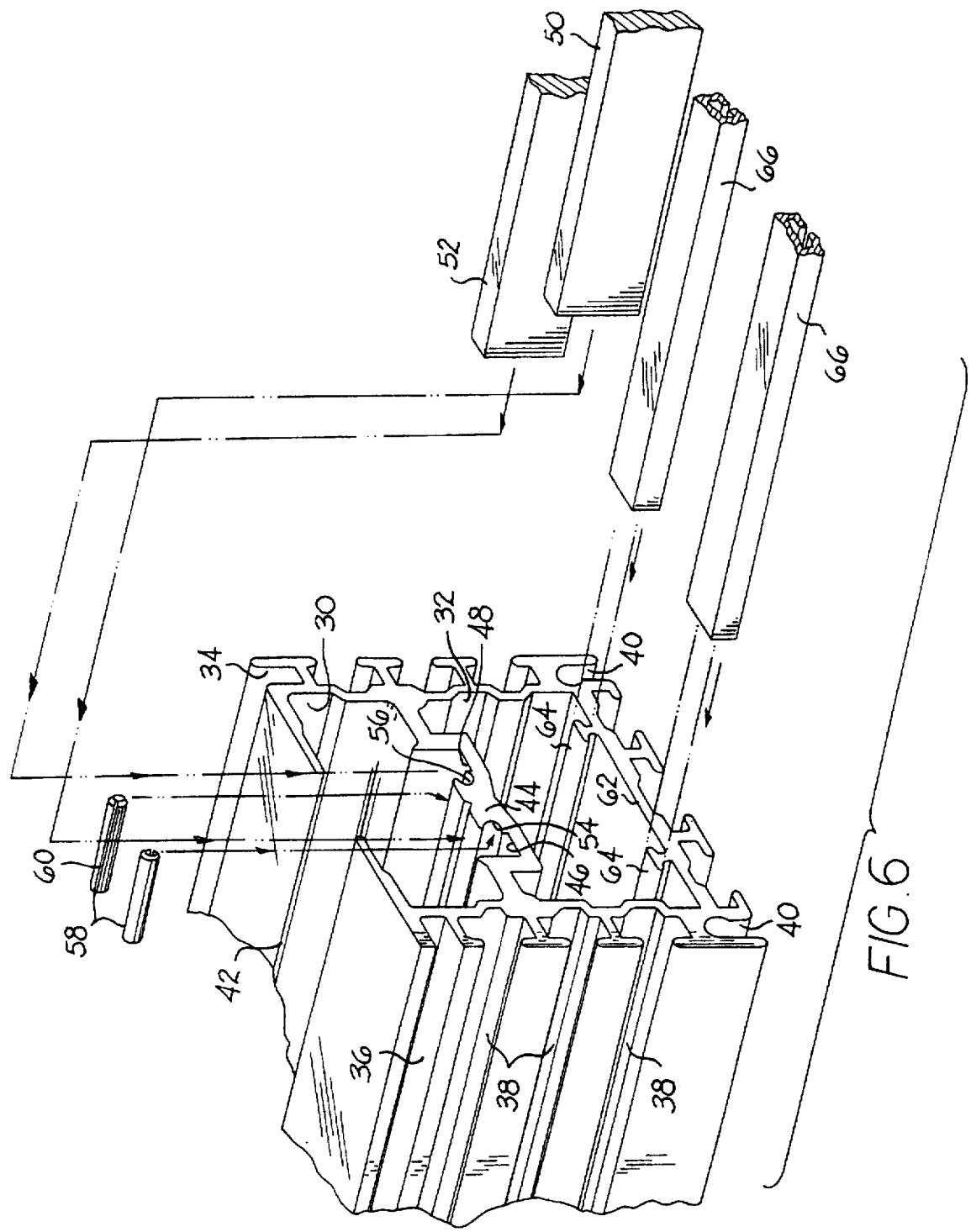
FIG. 6 is an exploded perspective view showing an end of the conveyor, with the drive removed.

The retaining slot 56 and spring pin 58 are shown in more detail in FIG. 3A. The retaining slot 54 is a mirror image of the retaining slot 56. As shown here, the retaining slots 54, 56 have a substantially arc-shaped cross-section. However, the slots 54, 56 may have other suitable shapes as long as they provide a space for a pin to enter the retaining slot from the top and provide an opening so that the pin can push against its respective rail. It is preferred that the retaining slots 54, 56 extend for an angle α of greater than ninety degrees from their bottom-most point to their top-most point, as shown in FIG. 3A, so that the retaining slot extends above the center of the pin, in order to prevent the spring pin 58 from popping back out of the slot once it has been inserted. It will be noted that the spring pin 58 has a lengthwise cut 60, which allows the pin to flex. FIG. 6 also shows that the spring pins 58 are preferably cylindrical in shape and have a lengthwise cut 60, which allows them to be compressed and to spring back to their original shape.

While this shape is preferred, it is also clear that other shapes of spring pins could be used.

FIG. 3 also shows the lower chamber 32, which has a floor 62. Two parallel projections 64 project upwardly from the floor 62 and have a T-shaped cross-section along their entire length. Hollow rails 66, having a corresponding T-shaped internal cross-sectional shape slide over the T-shaped projections to provide lower rails to support the chain 18 on its return run.

Figure 5:
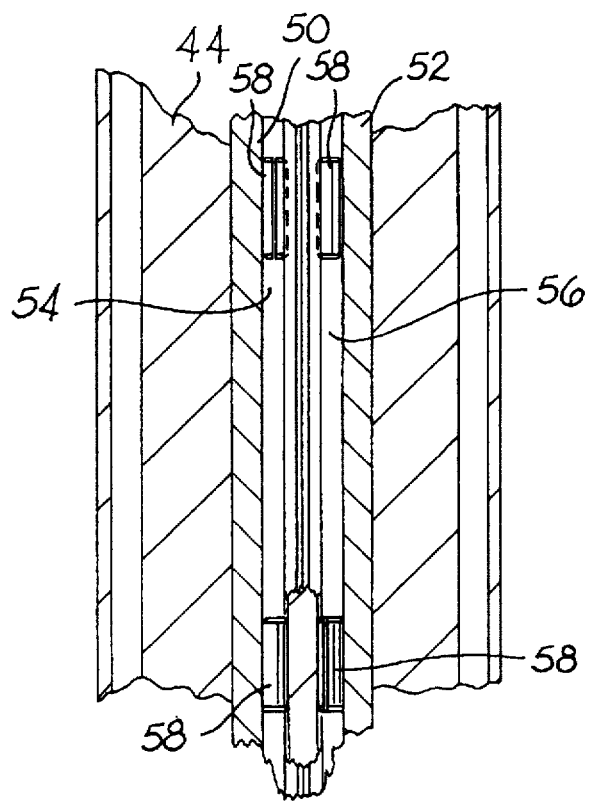
FIG. 5 is a view taken along the section 5—5 of FIG. 3.

It should be noted that the frame 14 is preferably made by extrusion, so that the cross-sectional shape shown in FIG. 3 is the cross-sectional shape of the frame 14 along its entire length. The cross-sectional shape of the rails 46, 48, 66 is also the same along the entire length. As shown in FIG. 5, the spring pins 58 are inserted at intervals along the length of the frame 14 as needed to retain the rails 50, 52.

FIG. 5 also shows that the retaining slots 54, 56 open upwardly, so as to permit the spring pins 58 to be inserted after the rails 50, 52 are inserted into their slots 46, 48.

Figure 4:
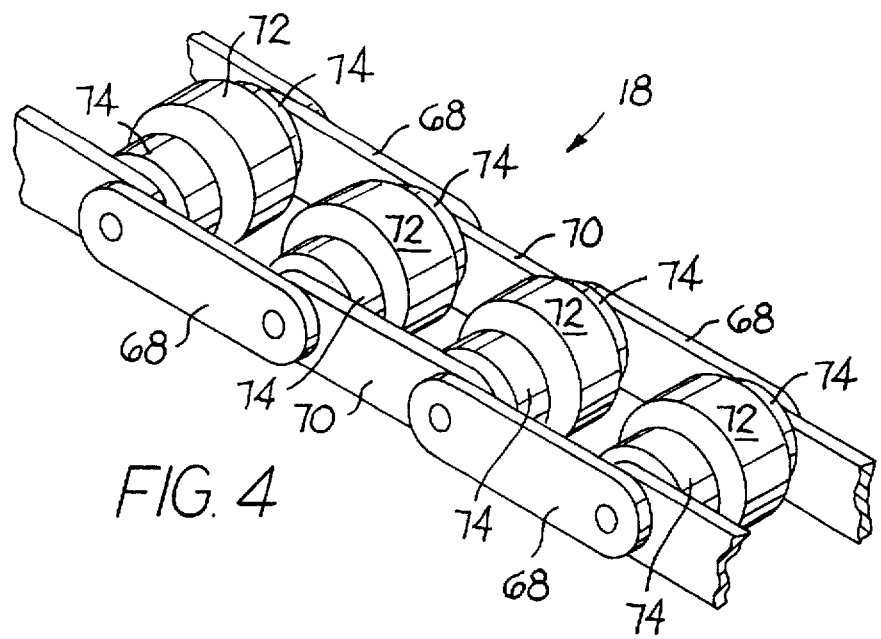
FIG. 4 is a perspective view of the chain shown in FIG. 2.

FIGS. 3 and 4 show the chain 18 (which is the same as the chain 16) in more detail. The chain 18 includes outer sidebars 68, inner sidebars 70, large-diameter central rollers 72, small diameter side rollers 74, and chain pins 76, which hold all the other parts together. The large diameter central rollers 72 contact the load 24 which is carried by the conveyor, and the small diameter rollers 74 ride on the rails 46, 48. Each pair of small diameter rollers 74 drives its respective large diameter roller 72. This permits the products to be carried at the chain speed plus the speed of the large rollers. Typically, the products are carried at greater than two times the speed the chain is moving. Several different designs of this type of chain are known in the art.

FIG. 6 is a perspective view of the frame 14, rails 50, 52, 66, and spring pins 58. It shows that the upper rails 50, 52 enter through the top opening 42. The pins 58 are pushed down into the retaining slots 54, 56 to hold the rails 50, 52 in place on the frame 14. (To remove the rails 50, 52, the pins 58 must be removed first.) The hollow, lower rails 66 slide onto their T-shaped projections 64 from the end, with the drive and sprockets removed from the frame 14.

It will be obvious to those skilled in the art that modifications may be made to the embodiment of the invention described above, without departing from the scope of the invention.

What is claimed is:

1. A conveyor frame for a chain-driven conveyor, comprising:
    an elongated frame member having an exterior side and an interior side and defining elongated upper and lower chambers, said upper chamber defining a top opening and including a web which defines the bottom of said upper chamber;
    said web defining a pair of parallel, upwardly-opening, rail-receiving slots lying in said upper chamber below said top opening and a pair of elongated retaining slots opening into their respective rail-receiving slots;
    wherein removable conveyor rails may be inserted into said rail-receiving slots of said frame by entering through said top opening and may be retained in said rail-receiving slots by spring pins lying in said retaining slots.

2. A conveyor frame as recited in claim 1, wherein each of said retaining slots has a cross-section which wraps around more than ninety degrees from the bottom-most point of the slot to the uppermost point of the slot.

3. A conveyor frame as recited in claim 2, wherein the cross-sectional shape of each of said retaining slots is a portion of a circle.

4. A conveyor frame as recited in claim 1, and further comprising a pair of rails received in said rail-receiving slots and a plurality of spring pins received in said retaining slots, thereby retaining the rails on said frame.

5. A conveyor frame as recited in claim 3, and further comprising a pair of rails received in said rail-receiving slots and a plurality of spring pins received in said retaining slots, thereby retaining the rails on said frame.

6. A conveyor frame as recited in claim 1, wherein said lower chamber has a floor, and further comprising a pair of T-shaped cross-section projections extending upwardly from said floor; and a pair of hollow rails, having a corresponding T-shaped interior cross-section being received on said projections.

7. A conveyor frame as recited in claim 4, and further comprising a chain received in said frame, said chain including a plurality of large, central rollers and a plurality of left and right smaller diameter rollers adjacent the left and right sides of said large central rollers, wherein said smaller diameter rollers roll on said rails.

\* \* \* \* \*